United States Patent [19]

Thor

[11] Patent Number: 5,459,723

[45] Date of Patent: Oct. 17, 1995

[54] PACKET MANAGEMENT DEVICE FOR FAST-PACKET NETWORK

[75] Inventor: Allen Thor, Livingston, N.J.

[73] Assignee: Advanced Micro Devices, Parsippany, N.Y.

[21] Appl. No.: 207,520

[22] Filed: Mar. 8, 1994

[51] Int. Cl.[6] .................................................. H04Q 11/04
[52] U.S. Cl. ........................................... 370/60; 370/94.1
[58] Field of Search ............................. 370/60, 94.1, 15, 370/85.1, 85.2, 85.5, 95.1, 95.2, 95.3, 58.1, 85.13, 13, 61, 99

[56] References Cited

U.S. PATENT DOCUMENTS

| | | | |
|---|---|---|---|
| 4,638,475 | 1/1987 | Koike | 370/60 |
| 4,933,938 | 6/1990 | Sheehy | 370/85.13 |
| 5,086,428 | 2/1992 | Perlman et al. | 370/60 |
| 5,136,584 | 8/1992 | Hedlund | 370/94.1 |
| 5,189,672 | 2/1993 | Le Bihan | 370/60 |
| 5,249,468 | 2/1994 | Yoshida | 370/85.13 |
| 5,311,509 | 5/1994 | Heddes et al. | 370/60 |
| 5,361,259 | 11/1994 | Hunt et al. | 370/85.13 |
| 5,363,369 | 11/1994 | Hemmady et al. | 370/85.13 |

Primary Examiner—Douglas W. Olms
Assistant Examiner—Shick Hom
Attorney, Agent, or Firm—Lowe, Price, LeBlanc & Becker

[57] ABSTRACT

In a fast-packet network, incoming high-level data-link control (HDLC) data are supplied by a receiving line interface device to a packet management device comprising a receiving state machine that shifts the data through a data link connection identifier (DLCI) extractor. The extracted DLCI is used as an address indicating a location of a translation RAM that stores the destination DLCI and control data corresponding to the incoming HDLC data. The destination DLCI replaces the current DLCI field of the incoming data. A frame control state machine requests a frame buffer of a frame buffer RAM to be allocated to the incoming HDLC packet and writes the data to the allocated buffer. Simultaneously, a packet availability message is sent to the destination packet management device indicated by the control data in the translation RAM. A transmitting circuit of the destination packet management device has a transmitting state machine that rewrites the HDLC data from the frame buffer RAM to a FIFO register. When the FIFO register is full or entire data frame is in the FIFO register, the data are transferred to an HDLC transmitter coupled to a transmitting line interface device.

25 Claims, 5 Drawing Sheets

| | 7 | 6 | 5 | 4 | 3 | 2 | 1 | 0 |
|---|---|---|---|---|---|---|---|---|
| FLAG | | | | | | | | |
| DLCI (HIGH ORDER) | | | | | | | C/R | EA |
| DLCI | | | | | FECN | BECN | DE | EA |
| INFORMATION FIELD | | | | | | | | |
| FCS | | | | | | | | |
| FCS | | | | | | | | |
| FLAG | | | | | | | | |

Figure 1

PACKET MANAGEMENT DEVICE FOR FAST-PACKET NETWORK

TECHNICAL FIELD

This invention relates generally to data packet switching and more particularly, to a packet management device for frame relay and cell relay networks.

BACKGROUND ART

The basic concepts of fast-packet networks are found in intelligent end-user systems, reliable digital transmission facilities, and high-speed communication systems. The growth in computer applications which require high speed communications, the proliferation of intelligent personal computers and work stations, and the growing availability of error-free high-speed transmission lines have combined to create a need for a new form of wide area network switching. This new switching technology requires high-speed, low delay, port sharing and band width sharing on a virtual circuit basis. TDM circuit switching provides the first two characteristics, and X.25 packet switching provides the last two. Fast-packet technology was developed as a new form of "packet mode" switching to provide all four characteristics, which together make fast-packet network an ideal solution for the bursty traffic sources found in LAN-WAN inter-networking.

Fast-packet technology offers users the ability to improve performance (response time) and reduce transmission costs dramatically for a number of important types of network applications. In order to be effective, fast-packet networks require that three conditions be met: (1) the end devices must be running an intelligent higher-layer protocol; (2) the transmission lines must be virtually error-free; and (3) the application must tolerate variable delay.

Other wide area network switching technologies, such as X.25 packet switching and TDM circuit switching, will remain important where line quality is not as good, when the network itself must guarantee error-free delivery or when the traffic (e.g., video or voice) is intolerant of delay.

A fast-packet network provides a "packet mode" service which uses statistical multiplexing and port sharing characteristics. However, unlike X.25, the fast-packet network completely eliminates all processing at Layer 3. Furthermore, it uses only a portion of the functions of Layer 2, the so-called "core aspects," which include checking for a valid error-free frame but not requesting retransmission if an error is found. Thus, protocol functions such as sequence number, window rotation, acknowledgements and supervisory packets are not performed within the fast-packet network. The result of stripping so many functions out of fast-packet network is that through-put (i.e., the number of frames that can be processed per second for a given cost of hardware) can be dramatically increased, since each packet requires much less processing. For the same reason, the delay through a fast-packet network is lower than that of X.25 although it remains higher than a TDM network which does no processing at all.

In order to be able to remove so many functions from the fast-packet network, the end devices must take the responsibility for assuring the error-free end-to-end transmission of data. The fact is that more and more of the end devices, particularly those attached to LANs, have the intelligence and processing power to perform that function.

Frame relay and cell relay are the two divisions of fast-packet technologies. Frame relay uses a framing structure which has variable lengths ranging from just a few characters to well over a thousand. This feature, which it shares with X.25, is very important in making frame relay operate well with LANs and other sources of synchronous data traffic, which require variable frame sizes. It also means that the delays encountered by the traffic (although always lower than X.25) will vary depending upon the sizes of the frames being sent. Some types of traffic are intolerant of delay, particularly delay which is variable. Voice is one example and video is another. For that reason, frame relay is not well suited to carrying such delay-sensitive traffic. On the other hand, it is very well matched to the requirements of bursty data sources such as LAN-to-LAN traffic.

When compared to X.25 packet, frame relay makes a small change to the frame structure by adding to the header at the beginning of the frame. The frame relay header contains the Data Link Connection Identifier (DLCI), which is the frame relay virtual circuit number corresponding with a particular destination. In the case of LAN-WAN internetworking, the DLCI would denote the port to which the destination LAN is attached. The DLCI allows data coming into a frame relay network node to be sent across the network using a 3-step process:

1. Check the integrity of the frame using the Frame Check Sequence (FCS) and if it indicates an error, discard the frame.

2. Look at the DLCI in a table, and if the DLCI is not defined for this link, discard the frame.

3. Relay the frame toward its destination by sending it out the port or trunk specified in the table.

The two principal reasons frame relay data might be discarded are the detection of errors in the frame and the occurrence of congestion (the network is overloaded). The discard of frames does not interfere with the integrity of communications because of the intelligence in the end point devices such as PCs, work stations and hosts. These intelligent devices are operating with multi-level protocols which can detect and recover from loss of data in the network. The upper layer protocol in the end devices keeps track of the sequence numbers of the various frames sent and received. Acknowledgements are sent to inform the sending end which frame numbers have been successfully received. If a sequence number is missing, the receiving end will request a retransmittal. In this manner, the end devices assure that all of the frames eventually are received without errors.

FIG. 1 is a field diagram of the frame relay high-level data-link control (HDLC) format, comprising a flag area used for delimiting frames, followed by the DLCI area representing the addressing mechanism of frame relay. The DLCI consists of the six most significant bits of the second octet plus the four most significant bits of the third octet of the frame-relay frame. The DLCI bits of the second octet are followed by the Command/Response (C/R) indication bit. Additional bits, dependent upon the value of the extended address (EA) bit may be used to extend the DLCI beyond 10 bits to form a complete DLCI. The two-octet version of the DLCI shown in FIG. 1 covers 1024 addresses. In present implementations of frame relay, there are several restrictions placed on the assignment of DLCI values per ANSI specification. DLCI 0 is reserved for in channel call control signalling. DLCIs 1 through 15 and 1008 through 1022 are reserved for future use, and DLCI 1023 is reserved for Local Management Interface (LMI) communications. This leaves the 992 DLCIs from 16 through 1007 available for user data.

DLCIs 16–991 are assigned to logical connections and DLCIs 992–1007 are used for Layer 2 management.

The DLCI area is followed by the Forward Explicit Congestion Notification (FECN) and Backward Explicit Congestion Notification (BECN) bits. The FECN bit indicates that congestion avoidance procedures should be started in the direction of the frame (Source→ Network→End point). This bit may be used by the receiving end point to adjust the rate of the destination-controlled transmitter. The end point should slow down transmission of messages resulting in responses/acknowledgements.

The BECN bit indicates that congestion avoidance procedures should be started in the opposite direction of the frame (End point→Network→Source). This bit may be used by the receiving end point to adjust the rate of the source-controlled transmitters. The source should slow down all transmissions to the network.

The Discard Eligibility (DE) bit is used to indicate a frame's suitability for discard in network congestion situations. The indicated frames should be discarded in preference to other frames during congestion.

The information field of variable length carries user control data and information that are not interpreted by frame relay.

The two-octet Frame Check Sequence (FCS) field following the information field is used to verify that a frame is not corrupted during transmission. The FCS is the result of applying the Cyclic Redundancy Checking (CRC) polynomial to the frame from the first bit of the address field to the last bit of the information field. The FCS is calculated by the source device and recalculated by the destination device. If the two FCSs do not match, then the frame is discarded. The FCS is followed by a closing flag.

Cell relay is another division of fast-packet technologies. Like frame relay, cell relay requires intelligent end systems, reliable digital transmission facilities, and high-bandwidth capacities. The major difference between frame relay and cell relay is the units of information transferred. While frame relay transfers information in variable length "frames", cell relay transfers information in fixed length "cells".

The frame relay protocol is defined in standards listed in Table 1. Cell relay is defined in the ATM and 802.6 DQDB standards.

TABLE 1

| Frame relay and related standards | | |
|---|---|---|
| Organization | Standard | Description |
| ANSI | T1.606-1990 | Integrated Services Digital Network (ISDN)-Frame Relaying Bearer Service-Architectural Framework and Service Description for Frame Relaying Bearer Service |
| ANSI | T1S1/90-175R4 | Addendum to T1.606 |
| ANSI | T1S1/88-2242 | Frame Relay Bearer Service-Architectural Framework and Service Description |
| ANSI | T1S1/90-214 (T1.6ca) | DSS1 - Core Aspects of Frame Protocol for Use with Frame Relay Bearer Service |
| ANSI | T1S1/90-213 (T1.6fr) | DSS1 - Signalling Specification for Frame Relay Bearer Service |
| CCITT | I.122 | Framework for Providing Additional Packet Mode Bearer Services |
| CCITT | I.431 | Primary (1544.2048 Kbps) ISDN Interface |

TABLE 1-continued

| Frame relay and related standards | | |
|---|---|---|
| Organization | Standard | Description |
| CCITT | Q.922 | ISDN Data Link Layer Specification for Frame Mode Bearer Service |
| CCITT | Q.931 | ISDN Network Protocol |
| CCITT | Q.933 | ISDN Signaling Specification for Frame Mode Bearer Services |

Currently, the frame relay and cell relay protocols are implemented in software and their throughput is restricted by processing power of systems providing software support of packet switching. Hence, there is a need for frame relay and cell relay to be implemented in hardware to eliminate processing bottlenecks of the software based fast-packet switching networks. Accordingly, it would be desirable to provide a packet management device able to perform packet address translation and packet routing to support frame or cell relay protocols in hardware.

DISCLOSURE OF THE INVENTION

One advantage of the invention is in providing a packet management device that supports frame relay and cell relay protocols in hardware.

Another advantage of the invention is in providing a packet management device that eliminates processing bottlenecks associated with fast-packet switching.

The above and other advantages of the invention are achieved, at least, in part, by providing in a packet switching network having data receiving means for converting data received from a transmitting data terminal into a data packet with an address field, packet buffer means for temporary storing the data packet and data transmitting means for converting the data packet read from the buffer means into data transmitted to a receiving data terminal; apparatus for packet processing that comprises a packet receiver for receiving the data packet. The address field is separated from the data packet by an address extractor. The extracted address field designates an entry in a translation memory that stores translated address data and control data. In response to the control data, an address substitution circuit replaces the address field in the data packet with the translated address data. A packet control circuit transfers the data packet with the translated address data into the packet buffer means. In response to a control message from the packet control circuit, a packet transmitter reads the data packet from the packet buffer means and transfers the data packet to the data transmitting means.

In accordance with particular aspects of the invention, the data packet may comprise a data frame formatted to meet the frame relay standards or a data cell formatted to meet the cell relay standards.

For network control and maintenance functions, the translation memory sends the data packet to a control processor of the network in response to the control data stored in the cell designated by the address field of the data packet. The translation memory is updated by the control processor in response to the data packet.

In accordance with a preferred embodiment of the invention, a frame processing system for a frame relay network comprises means for receiving data frames having incoming address fields formatted to provide data frame switching via the frame relay network. Means responsive to the receiving means separate the incoming address fields from the data frames. Storing means responsive to the incoming address fields supply the receiving means with destination address fields and control data. A frame control means responsive to the storing means replace the incoming address fields with the destination address fields. Buffer means responsive to the frame control means temporarily store the data frames having the destination address fields. Data frame transmitting means designated by the control data read the data frames from the buffer means and transmit the read data frames in accordance with their destination address fields.

Preferably, storing means stores the destination address fields and control data in cells designated by the incoming address fields. The receiving means may cause the data frames to be discarded when the control data indicate that their incoming address fields are not active. The data frame transmitting means read the data frames from the buffer means in response to a control message from the data frame control means. The control message may include addresses of buffer units in the buffer means wherefrom the data frames are to be read.

In accordance with one feature of the invention, data frame transmitting means comprises a FIFO register that stores the data frames supplied by the buffer means. The data frames are stored in the FIFO register until the FIFO register is full or until a complete data frame is accumulated in the FIFO register.

In accordance with another feature of the invention, the storing means supply control information contained in the data frames to a control processor that updates contents of the storing means.

In accordance with the method of this invention the following steps are carried out. In a packet switching network having data receiving means for converting data received from a transmitting data terminal into a data packet with an address field, packet buffer means for temporarily storing the data packet and data transmitting means for converting the data packet read from the buffer means into data transmitted to a receiving data terminal, a method of packet processing provides:

receiving the data packet, separating the address field from the data packet, supplying a translated address data and control data stored in a storage cell designated by the address field, replacing the address field in the data packet with the translated address data, transferring the data packet with the translated address data into the packet buffer means, reading the data packet from the packet buffer means in response to the control data, and transmitting the data packet to the data transmitting means.

In the preferred embodiment, the validity of the translated address data may be checked to discard the data frame if the translated address data are not active. Furthermore, a packet check field of the data packet may be checked to discard the data packet if the packet check field indicates a transmission error. Moreover, checking whether the packet buffer means have a space available to store the data packet may be provided in order to discard the data packet if the packet buffer means have no available space.

The data frames may be buffered in a FIFO register. Checking whether the FIFO register is full or a complete data frame is stored in the FIFO register may be carried out before transferring the data frame to the transmitting means.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a diagram showing a frame format in a Frame Relay network.

BEST MODE FOR CARRYING OUT THE INVENTION

Although the invention has general applicability in the field of data packets manipulation, the best mode for practicing the invention is based in part on the realization that the data packets transferred over the packet switching network have the frame relay HDLC format shown in FIG. 1. Accordingly, whereas the disclosure of this invention will be made in the field of frame relay, it is to be understood that the invention has broader applications.

Figure 2:
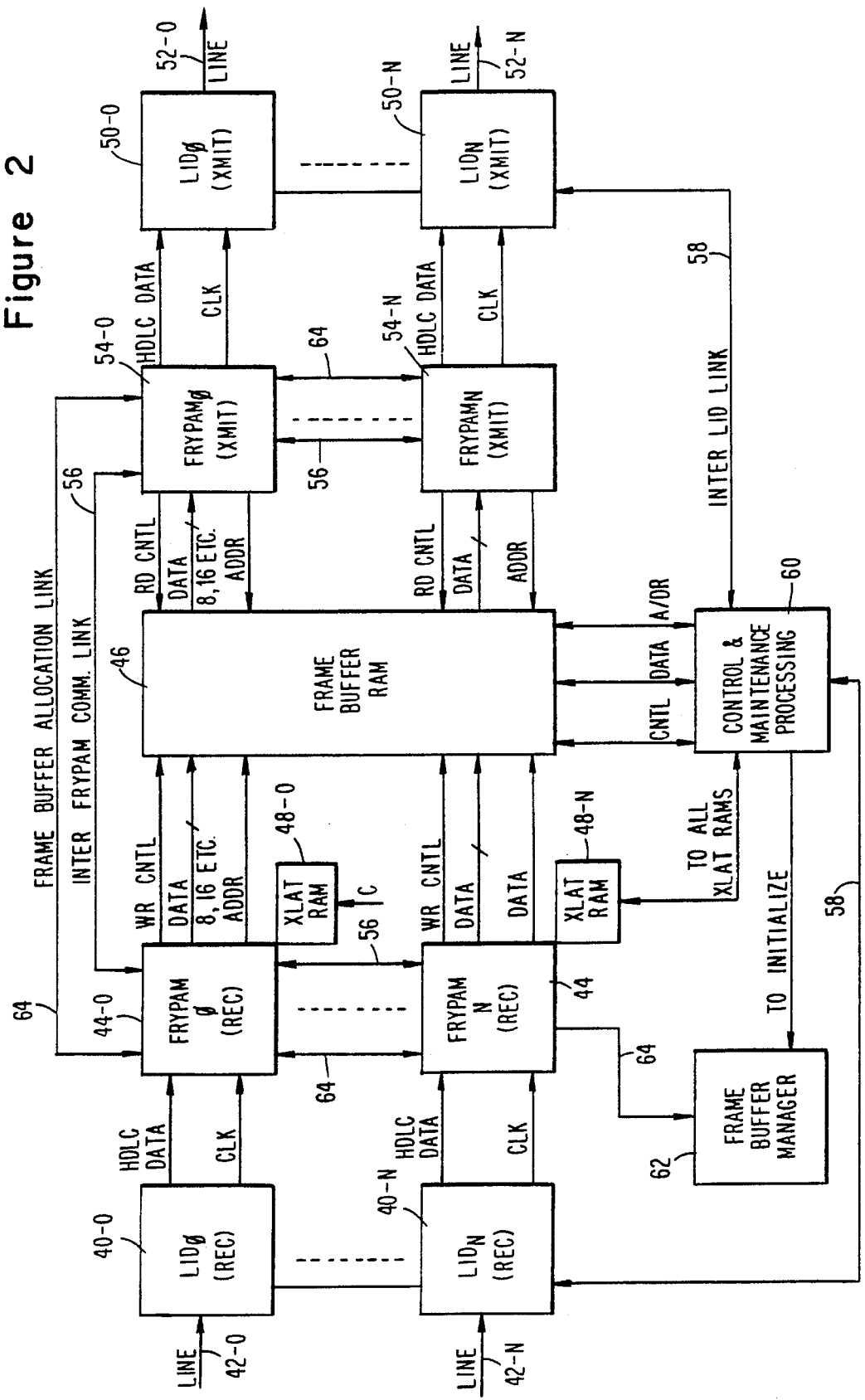
FIG. 2 is a diagram illustrating general architecture of a switching network in accordance with the present invention.

Referring to FIG. 2, in a frame relay network, line interface devices (LIDs) LID0-LIDn are coupled through input/output (I/O) communication lines to end devices. To make the disclosure more clear, FIG. 2 shows receiving and transmitting sections of the LIDs as separate blocks 40-0 - 40-N and 50-0 - 50-N, respectively, coupled to input communication lines 42-0 - 42-N and output communication lines 52-0 - 52-0. However, it is to be understood that LIDs 40 and 50 may be implemented as integral devices to provide bi-directional line interface with an I/O communication bus. The LIDs may interface the network to a specific data terminal, for example, synchronous, asynchronous terminals or T1 line, by performing on the receive side the physical translation of information on the input lines to clock signal CLK and HDLC framed data having the format shown in FIG. 1. On the transmit side, the HDLC framed data and clock signal CLK are translated into the data appropriate for an end device. The type of the translation is specific to the line to be interfaced with. It may include some buffering capability to compensate for line jitter, transfer latency, etc. In the case of asynchronous data terminal, asynchronous to HDLC conversion must be performed. The synchronous data terminal may require time slot to HDLC conversion. To support cell relay switching, the LIDs perform cell assembly and disassembly in addition to the line interface functions.

Accordingly, the specific type of LID is required to support the specific end device. As the outputs of the LIDs provide uniform HDLC framed data and a clock, a general purpose modular switch may be provided by installing the appropriate LIDs for specific line interface requirements. This reduces the system cost by repeating the same network hardware for each LID, regardless of the LID data rate. The structure of various specific LIDs is described in my copending application Ser. No. 08/236,853, entitled "Line Interface Device for Fast-Packet Network," filed May 2, 1994 and incorporated by reference.

The data frames transferred through the switching network are buffered in a frame buffer RAM 46 coupled to the LIDs through corresponding Frame Relay Packet Management devices (FRYPAM). The receiving FRYPAM sections 44-0 - 44-N provide management of the frame queue transmitted from the receiving LID sections 40-0 - 40-N, respectively. The transmitting FRYPAM sections 54-0 - 54-N transfer the frames read from the frame buffer RAM 46 to the transmitting LID sections 50-0 - 50-N, respectively.

As indicated above, an input to the receiving FRYPAM from the receiving LID comprises HDLC framed data and clock CLK. The FRYPAM checks the FCS field of the frame that may comprise a cyclic redundancy code (CRC). The frame is discarded, if its CRC has an error. Further, the FRYPAM extracts the 10-bit DLCI field of the received frame and uses this value as the address into a translation (XLAT) RAM 48 attached to each receiving FRYPAM.

Figure 3:
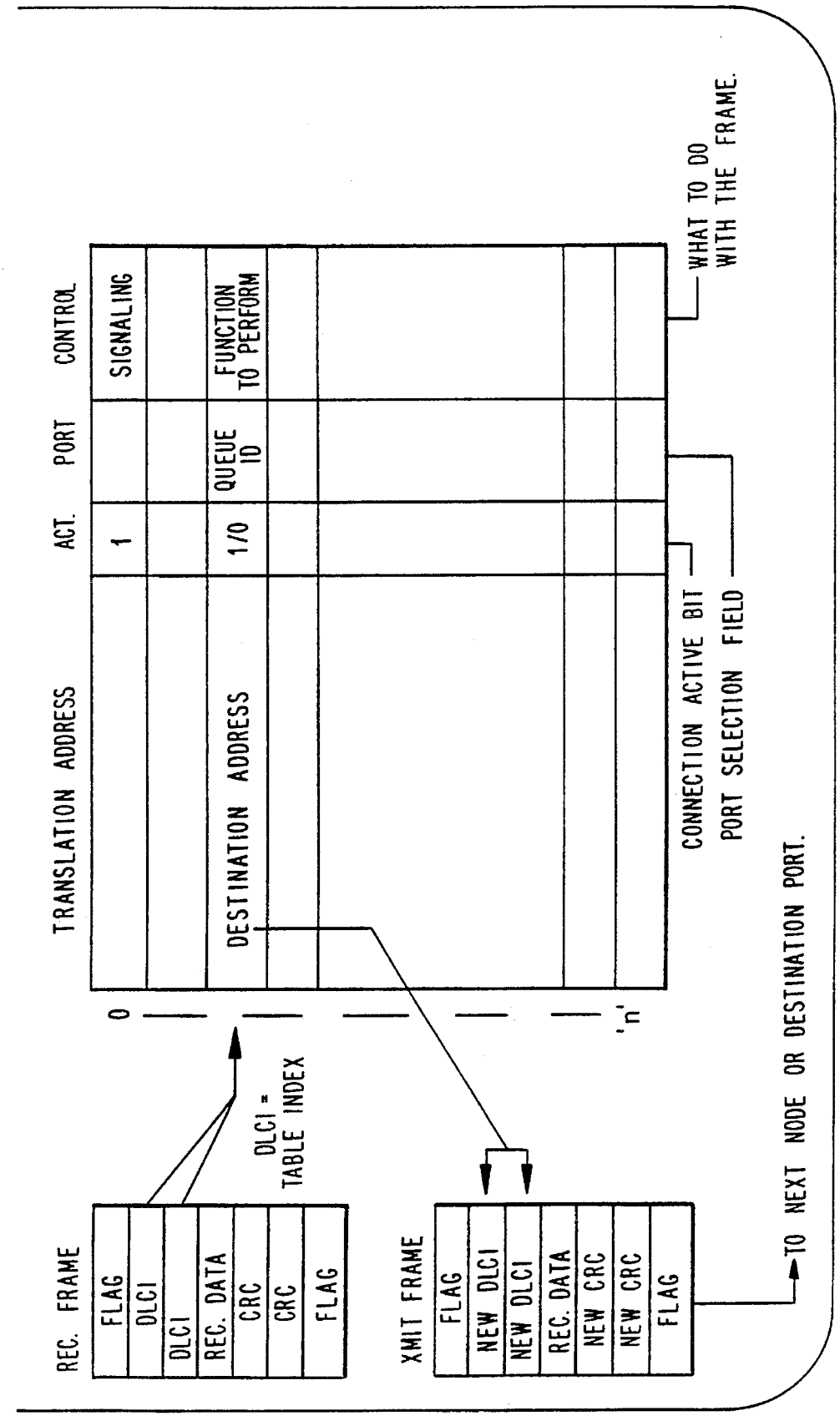
FIG. 3 shows a look-up table in an XLAT RAM.

Each of the translation RAMs 48-0 - 48-N respectively coupled to the FRYPAMs 44-0 - 44-N comprises a look-up table shown in FIG. 3 that contains a list of destination addresses, connection active bits, port selection fields and control field. As frames are received by the FRYPAM, the extracted DLCI address field provides an index to a new destination address in the table. The new destination address is read from the translation RAM to replace the address in the received frame. The same index is used to select the destination port and to determine additional functions to be performed with the received frame. If the connection active bit indicates that the DLCI is not active, the frame is discarded.

If the frame is to be relayed, its DLCI is replaced with the new destination address, and the receiving FRYPAM generates a write control signal WR CNTL and addressing signal ADDR to write the new address together with the remaining frame data in the location of the frame buffer RAM. When a complete frame has been stored in the frame buffer RAM, the receiving FRYPAM sends a packet availability message to the destination transmitting FRYPAM via inter FRYPAM communication link 56 that connects all of the transmitting and receiving FRYPAMs. The identification number of the destination FRYPAM is read from the look-up table in the translation RAM. The packet availability message comprises the address of the frame in the frame buffer RAM and byte counts indicating the length of the frame. The transmitting FRYPAM maintains a transmit queue for all frames it must transmit. It generates a read control signal RD CNTL and addressing signal ADDR to read the frames from the frame buffer RAM 46 and to send them to the corresponding transmitting LID 50 in the HDLC format (HDLC data) together with a clock signal CLK. The transmitting LIDs convert the HDLC data from the FRYPAMs to the format appropriate for the specific line interface. This information is then transmitted over the communication lines 52 to the receiving end device or data terminal. Like the LIDs, the FRYPAM receiving and transmitting sections may be implemented in an integral device. The frame processing procedure performed by the receiving and transmitting FRYPAMs and their structure are disclosed in more detail later.

If the look-up table in the translation RAM indicates that the received frame carries control or maintenance information, the transmission FRYPAM sends this frame to a control and maintenance processor 60 that handles control and maintenance operations in the switching network. The processor 60 uses the control and maintenance frames to update the contents of the translation RAMs in real time as virtual connections are altered. It may also perform call processing functions to support switched services and respond to or initiate maintenance operations (for example, loopbacks or error counts) throughout the network. Furthermore, the control and maintenance processor 60 communicates DLCI and line interface parameters to LIDs via an inter LID link 58 that connects all of the LIDs to each other and to the processor 60.

As indicated above, the receiving FRYPAMs write the received frames into the frame buffer RAM 46. With multiple FRYPAMs writing into a common frame buffer RAM having a plurality of frame buffers, a frame buffer manager 62 that maintains a dynamic list of available frame buffers of the RAM provides allocation of the frame buffers for the receiving FRYPAM operations. The communication between the FRYPAMs and the frame buffer manager occurs over a frame buffer allocation link 64 that connects all of the FRYPAMs to each other and to the frame buffer manager 62. Over this link, the transmitting FRYPAMs send deallocating signals that cause the frame buffer manager to release the allocated buffers when the data has been transmitted on the line. The frame buffer continuously tries to maintain buffers for all receiving FRYPAMs. If no buffers are available, the received frame is discarded. All frames are allocated the same amount of space in the frame buffer RAM. This space may be large enough to buffer the largest frame available on the network (typically 4K bytes). As shown in more detail later, the allocation may be performed by hardware.

Since the buffer allocation size for each frame is fixed, it is possible to allocate 56 byte frames in the frame buffer RAM to support cell relay switching. In this case, the LIDs may perform cell assembly and disassembly in addition to the line interface functions. Further, LIDs may extract the addressing information from the cell header and transform this data into an HDLC formatted fixed length frame. As a result, the FRYPAM operations are performed in the same way as for the frame relay switching. The structure and operation of the system shown in FIG. 2 are disclosed in more detail in my copending application Ser. No. 08/188,873, entitled "Modular Architecture for Fast-Packet Network," filed Jan. 31, 1994 and incorporated by reference.

Figure 4:
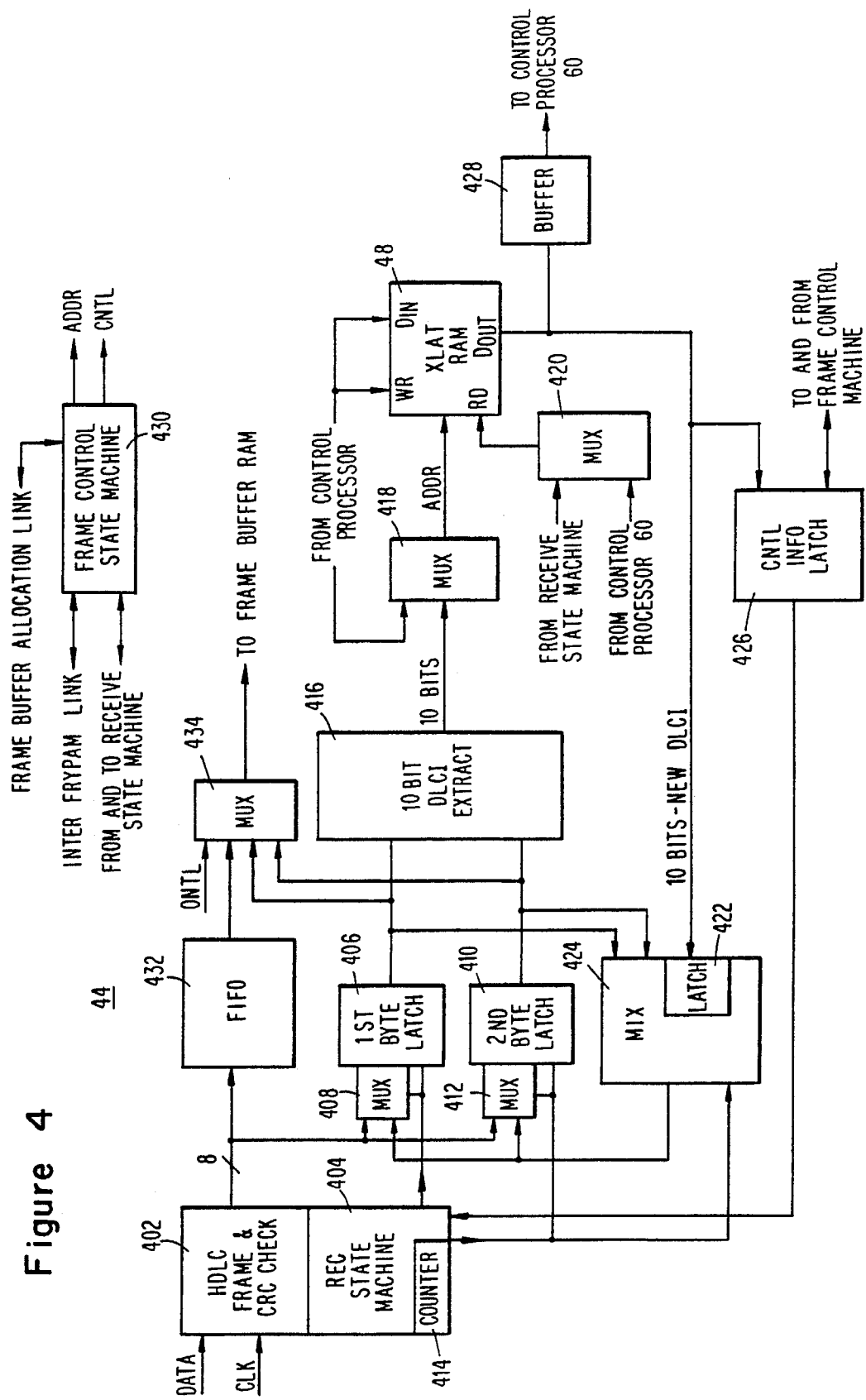
FIG. 4 is a circuit diagram illustrating the FRYPAM receiving section of FIG. 2 in more detail.

Reference is now made to FIG. 4 of the drawings showing the receiving section 44 of the FRYPAM that interacts with the XLAT RAM 48. As discussed above, the FRYPAM is supplied with data in the HDLC format shown in FIG. 1 and with a clock signal. A receiving circuit 402 receives the HDLC frame and clock and checks CRC information in the FCS field. The received information is supplied to a receiving state machine 404 that controls the DLCI translation procedure. As shown in FIG. 1, two 8 bit bytes following the flag field contain a 10 bit DLCI.

In state 0, the receiving state machine waits for the flag of the HDLC frame. If the flag is found, the state machine proceeds to state 1.

In state 1, the state machine 404 checks the next byte of the frame. If the next byte is a flag, the machine remains in state 1. If the next byte indicates an abort status, the machine returns to state 0. If the next byte is data, they are transferred to a first byte latch 406 through a multiplexer 408, and the state machine proceeds to state 2. A byte counter 414 counts the data bytes processed by the state machine starting with the first data byte.

In state 2, the receiving state machine checks the next byte of the frame. If the next byte is a flag, the machine returns to state 1. If the next byte indicates an abort status, the machine returns to state 0. If the next byte is data, it is transferred to a second byte latch 410 through a multiplexer 412, and machine proceeds to state 3.

In state 3, the state machine 404 shifts the 16 bit data from first and second byte latches 406 and 410 through a DLCI extractor 416 to extract the received 10 bit DLCI field. Through a multiplexer 418, this 10 bit value as an address is supplied to the address input of the XLAT RAM 48. Simultaneously, through a multiplexer 420, the receiving state machine supplies a read enabling signal to the XLAT RAM 48 to read data from the location having the address indicated by the 10 bit DLCI value.

As discussed above and shown in FIG. 3, the XLAT RAM contains a list of destination addresses, connection active bits, port selection fields and functions to be performed with the received frames. The extracted DLCI value provides an index to read the list corresponding to the received frame. The new destination address read from the list is supplied to a latch 422 of a mixer 424. The control information read from the XLAT RAM is loaded into a control information latch 426. If the XLAT RAM indicates that the received frame is a control frame that carries control and maintenance information, the control frame through a buffer 428 may be supplied to the control and maintenance processor 60. The buffer 428 is used to verify that the data written to the XLAT RAM is correct.

As discussed above, the control and maintenance processor 60 is responsible for updating the information stored in the XLAT RAM 64. It sends to the XLATRAM 48 an address signal via the multiplexer 418, read enabling signal via the multiplexer 420, write enabling signal and data to be written. The processor 60 updates DLCI, activity status and destination parameters stored in the XLAT RAM and initializes the XLAT RAM to a preset state after supplying with power or after a reset condition. Also, the control and maintenance processor may access the XLAT RAM to perform a memory test and to query connection information in real time via the units 428 and 420.

The control information latch 426 supplies the receiving state machine 404 with the control information to determine whether or not the new destination address is active. If so, the state machine provides the mixer 424 with a replacement enabling signal to rewrite the new 10 bit destination address from the latch 422 to the current DLCI field in the first and second byte latches 406 and 410. The byte counter 414 is set to 2 and the receiving state machine proceeds to state 4 sending a start allocation signal to a frame control state machine 430 to start transfer of the received data frame to the frame buffer RAM 46.

If the control information shows that the new destination address is not active, the receiving state machine returns to state 0.

In state 4, the receiving state machine 404 determines whether a next byte of the data flow has been received or not. If so, the receiving state machine checks this byte. If it is a flag, the machine returns to state 1. If the byte indicates an abort status, the machine returns to state 0. If the byte is data from the HDLC information field, the data is written into a FIFO register 432, and the byte counter 414 is incremented. If the next byte is determined to be CRC data from the first FCS field, this CRC data is not stored, and the byte counter 414 is not incremented. Finally, if the next byte is CRC data from the second FCS field, the CRC data is also not stored, and the byte counter 414 is not incremented, however the receiving state machine 404 sends the CRC check status and the byte count of the byte counter 414 to the frame control machine 430 and again proceeds to state 0. If the frame control machine 430 indicates an error condition, it proceeds to state 0 to discard the frame.

The frame control machine 430 is responsible for translation of the DLCI and preparation of the data for transferring to the frame buffer RAM. Also, the frame control state machine attempts to move the data to the frame buffer RAM and informs the destination FRYPAM that a new frame is available for transmission.

In state 0, the frame control machine waits for the start allocation signal from the receiving state machine 404. If the signal is received, the frame control machine proceeds to state 1.

In state 1, the frame control machine over the frame buffer allocation link 64 requests the frame buffer manager 62 to allocate a buffer in the frame buffer RAM to the received frame. If in response the frame buffer manager sends a buffer address, the address is saved, and the frame control machine proceeds to state 2. If in response the frame buffer manager indicates that no room is available in the frame buffer RAM, the frame control machine sends an error message to the receiving state machine 404 to discard the frame and returns to state 0.

In state 2, the frame control machine sends a control signal to a multiplexer 434 to enable writing the values stored in the first and second byte latches 406 and 410 into the frame buffer RAM using the buffer address (address from the frame buffer manager times frame buffer size). Then, the frame control machine proceeds to state 3.

In state 3, if data is in the FIFO register 432, the frame control machine sends a control signal to the multiplexer 434 to enable writing the data stored in the FIFO register to the frame buffer RAM. If CRC, rather than the information field data has been received and is incorrect, the frame control machine proceeds to state 4. However, if the received CRC is correct, the frame control machine goes to state 5.

In state 4, via the frame buffer allocation link 64, a release frame buffer message is issued to the frame buffer manager to release the allocated buffer.

In state 5, via the inter FRYPAM link 56, a packet availability message is transferred to the designated destination FRYPAM to inform that the received frame is available for transmission. The identification number of the destination FRYPAM is read from the control information latch 426 that receives this number from the XLAT RAM 48. The packet availability message includes the buffer address and the byte count of the counter 414.

If the designated destination FRYPAM is not able to transmit the frame, it sends a negative acknowledgement message. In response, the frame control machine proceeds to state 4 to release the allocated buffer. If the designated destination FRYPAM is ready for transmission, the frame control machine returns to state 0.

Figure 5:
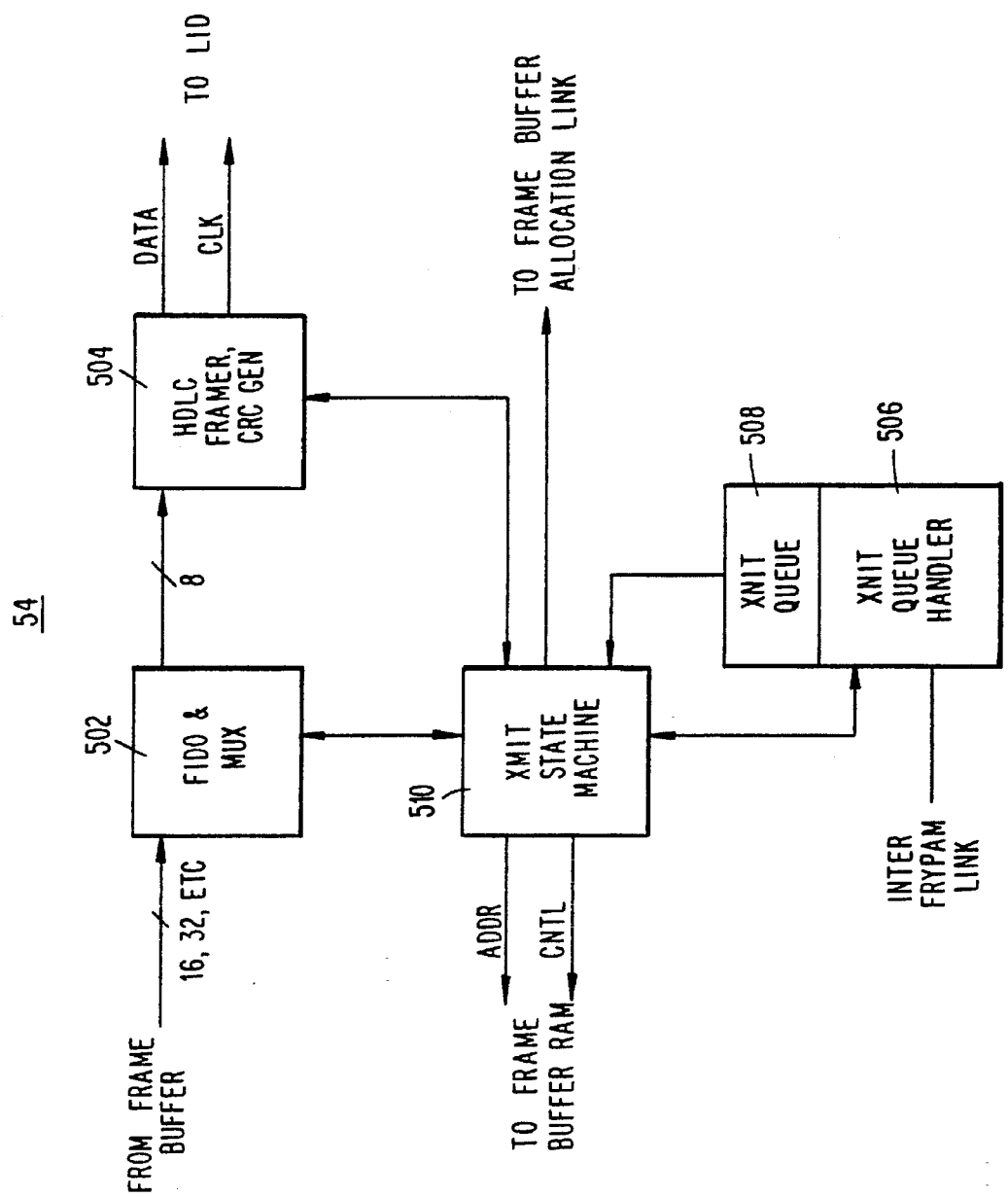
FIG. 5 is a circuit diagram illustrating the FRYPAM transmitting section of FIG. 2 in more detail.

Referring to FIG. 5, the transmitting section 54 of the destination FRYPAM comprises a FIFO register 502 coupled to an HDLC transmitter 504 that provides HDLC framing and CRC generation to form the HDLC data frame sent to the LID together with a clock signal.

The FIFO register 502 receives the data flow read from the frame buffer RAM to provide compensation for frame buffer access latencies when multiple FRYPAMs are accessing a common frame buffer RAM. In addition, as the frame buffer RAM may supply data in 16, 32 or larger bit width, the FIFO register 502 adopts the data flow to the HDLC transmitter that operates on a byte basis. Hence, multiple bytes may be transmitted with each transfer to provide more efficient access to the frame buffer RAM. The FIFO register 502 should be large enough to ensure that the frame buffer RAM access latency will never allow the FIFO register to become empty during the transmission of a frame. Otherwise, the HDLC transmitter 504 would be forced to underrun and possibly send erroneous data to the LID. If such a condition occurs, the HDLC transmitter sends an incorrect CRC that causes the frame to be discarded. The current frame would be retransmitted.

The packet availability message from the inter FRYPAM link is received by a transmit queue handler 506 that controls a transmit queue formed as a result of requests for frame transmission. The transmit queue handler is also responsible for clearing the transmit queue on power up or after a reset condition. All FRYPAMs have unique physical addresses that are programmable by external means, for example hardware address straps or software addressable latches. When a packet availability message arrives at the addressed FRYPAM, the transmit queue handler 506 adds this request to the transmit queue stored in a register 508, which may be a FIFO register or RAM capable of storing more than one request. If the transmit queue register is full, the handler sends a negative acknowledgement message to the source FRYPAM that causes the frame to be discarded. When the transmit queue register is empty, the HDLC transmitter 504 sends flags.

The transmit queue is supplied to a transmitting state machine 510 that controls the flow of frames sent from the frame buffer RAM through the HDLC transmitter to the corresponding LID. It also removes transmit queue entries and releases the allocated buffers in the frame buffer RAM when the entire frame has been sent to the LID.

When the transmit queue register 508 is empty, the transmitting state machine 510 is in state 0, waiting for the requests (packet availability messages) from the inter FRYPAM link. When a request is put into the transmit queue, the state machine proceeds to state 1.

In state 1, the state machine 510 reads the buffer address and byte count contained in the packet availability message put into the transmit queue and computes the actual buffer address transferred to the frame buffer RAM together with a control signal to read the corresponding data frame from the frame buffer RAM. The read data are supplied to the FIFO register 502 that stores the data until the FIFO register is full or the entire data frame is in the FIFO register. Then, the state machine 510 proceeds to state 2. If the FIFO register is not full and the entire frame is still not contained in the FIFO register, the state machine reads the next location from frame buffer RAM, and stores the data in the FIFO register until the FIFO register is full or the entire data frame is in the FIFO register.

In state 2, if the HDLC transmitter is available, the state machine 510 sends a control signal to the FIFO register 502 to transfer a byte of the data from the FIFO register to the HDLC transmitter for sending to the LID. The byte count is decremented. This procedure is performed repeatedly until the resulting byte count is 0. Then, the state machine proceeds to state 3.

In state 3, the transmitting state machine 510 instructs the HDLC transmitter to form CRC bytes to be sent to the LID. Then, the frame buffer manager is sent a frame buffer release message via the frame buffer allocation link to release the buffer allocated to the transmitted frame. The corresponding entry is removed from the transmit queue and the state machine 510 returns to state 0.

There accordingly has been described a FRYPAM that comprises receiving and transmitting circuits. The receiving circuit receives incoming HDLC data frames and replaces DLCIs of the incoming HDLC data frames with the destination DLCIs stored in the location of a translation RAM designated by the incoming DLCI. The translated data frames are written into a frame buffer RAM. A packet availability message is sent to the destination FRYPAM selected in accordance with control data stored in the designated location of the translation RAM. The transmitting circuit of the destination FRYPAM reads the data frames from the frame buffer RAM and supplies them to the destination LID.

Accordingly, the disclosed packet management device supports fast-packet switching protocols in hardware.

In this disclosure, there are shown and described only the preferred embodiments of the invention, but it is to be understood that the invention is capable of changes and modifications within the scope of the inventive concept as expressed herein.

I claim:

1. In a packet switching network having data receiving means for converting data received from a transmitting data terminal into a data packet with an address field, packet buffer means for temporary storing said data packet and data transmitting means for converting said data packet read from said buffer means into data transmitted to a receiving data terminal apparatus for packet processing coupled between said data receiving means and data transmitting means comprising:

a packet receiver for receiving said data packet, an address extractor for extracting said address field from said data packet, a translation memory for supplying a translated address data and control data stored in a cell designated by said address field, an address substitution circuit responsive to said control data for replacing said address field in said data packet with said translated address data, a packet control circuit for transferring said data packet with said translated address data into said packet buffer means, and a packet transmitter responsive to a control message from said packet control circuit for reading said data packet from said packet buffer means and transferring said data packet to said data transmitting means.

2. The apparatus of claim 1, wherein said packet control circuit forms said control message in response to said control data.

3. The apparatus of claim 1, wherein said data packet comprises a data frame formatted in accordance with frame relay requirements.

4. The apparatus of claim 1, wherein said data packet comprises a data cell formatted in accordance with cell relay requirements.

5. The apparatus of claim 1, wherein said data packet comprises a packet check field checked by said packet control circuit.

6. The apparatus of claim 1, wherein said translation memory sends said data packet to a control processor of said network in response to the control data stored in the cell designated by the address field of said data packet.

7. The apparatus of claim 6, wherein said translation memory is updated by said control processor in response to said data packet.

8. A frame processing system for a frame relay network comprising:

means for receiving data frames having incoming address fields formatted to provide data frame switching via the frame relay network, means responsive to said receiving means for extracting said incoming address fields from said data frames, storing means responsive to said incoming address fields for supplying said receiving means with destination address fields and control data, frame control means responsive to said storing means for replacing said incoming address fields with said destination address fields, buffer means responsive to said frame control means for temporarily storing said data frames having said destination address fields, data frame transmitting means designated by said control data of said storage means for reading data of said data frames from said buffer means and transmitting said data in accordance with said destination address fields.

9. The system of claim 8, wherein said storing means stores said destination address fields and control data in cells designated by said incoming address fields.

10. The system of claim 8, wherein said receiving means causes said data frames to be discarded when said control data indicate that their incoming address fields are not active.

11. The system of claim 8, wherein said data frame transmitting means reads said data frames from said buffer means in response to a control message from said data frame control means.

12. The system of claim 11, wherein said control message includes addresses of buffer units in said buffer means wherefrom said data frames are to be read.

13. The system of claim 8, wherein said data frames transmitting means comprises a FIFO register for storing said data frames supplied by said buffer means.

14. The system of claim 13, wherein said data frames are stored in said FIFO register until said FIFO register is full.

15. The system of claim 13, wherein said FIFO register stores data until a complete data frame is accumulated in said FIFO register.

16. The system of claim 8, wherein said storing means supplies control information contained in said data frames to a control processor.

17. The system of claim 16, wherein said control processor updates contents of said storing means.

18. In a packet switching network having data receiving means for converting data received from a transmitting data terminal into a data packet with an address field, packet buffer means for temporary storing said data packet and data transmitting means for converting said data packet read from said buffer means into data transmitted to a receiving data terminal, a method of packet processing comprising the steps of:

receiving said data packet, extracting said address field from said data packet, supplying translated address data and control data stored in a storage cell designated by said address field, replacing said address field in said data packet with said translated address data, transferring said data packet with said translated address data into said packet buffer means, reading said data packet from said packet buffer means in response to said control data, and supplying said data packet to said data transmitting means.

19. The method of claim 18, wherein said step of replacing comprises checking the validity of said translated address data to discard said data frame if said translated address data are not active.

20. The method of claim 18, wherein said step of transferring comprises checking a packet check field of said data packet to discard said data packet if the packet check field indicates a transmission error.

21. The method of claim 18, wherein said step of transferring comprises checking whether said packet buffer means have a space available to store said data packet in order to discard the data packet if said packet buffer means have no available space.

22. The method of claim 18, wherein said step of transmitting comprises buffering said data frame in a FIFO register.

23. The method of claim 22, wherein said step of transmitting further comprises checking whether said FIFO register is full before transferring said data frame to said transmitting means.

24. The method of claim 23, wherein said step of transmitting further comprises checking whether a complete data frame is stored in said FIFO before transferring said data frame to said transmitting means.

25. The apparatus of claim 6, wherein said control processor initializes said translation memory to a known state on a power up or reset condition.

* * * * *